(12) United States Patent
Karmarkar et al.

(10) Patent No.: US 11,683,243 B1
(45) Date of Patent: Jun. 20, 2023

(54) TECHNIQUES FOR QUANTIFYING THE RESPONSIVENESS OF A REMOTE DESKTOP SESSION

(71) Applicant: NVIDIA CORPORATION, Santa Clara, CA (US)

(72) Inventors: Nachiket Karmarkar, San Jose, CA (US); Kyungho Lee, San Jose, CA (US); Erik Bohnhorst, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/402,575

(22) Filed: May 3, 2019

(51) Int. Cl.
*H04L 41/5009* (2022.01)
*G06F 3/14* (2006.01)
*H04L 43/0864* (2022.01)
*H04L 43/16* (2022.01)

(52) U.S. Cl.
CPC ........ *H04L 41/5009* (2013.01); *G06F 3/1454* (2013.01); *H04L 43/0864* (2013.01); *H04L 43/16* (2013.01)

(58) Field of Classification Search
CPC . H04L 41/5009; H04L 43/0864; H04L 43/16; G06F 3/1454
See application file for complete search history.

(56) References Cited

U.S. PATENT DOCUMENTS

| | | | | |
|---|---|---|---|---|
| 5,034,598 A | * | 7/1991 | Poland | G06F 3/021 235/435 |
| 6,567,767 B1 | * | 5/2003 | Mackey | G06F 11/3419 702/182 |
| 2007/0126749 A1 | * | 6/2007 | Tzruya | A63F 13/63 345/581 |
| 2011/0141123 A1 | * | 6/2011 | Kumar | G06F 9/452 345/520 |

(Continued)

OTHER PUBLICATIONS

Web document "List of virtual key codes" (copyright 2007) to KbdSoft. ("KbdSoft") (Year: 2007).*

(Continued)

*Primary Examiner* — June Sison
(74) *Attorney, Agent, or Firm* — Davis Wright Tremaine LLP

(57) ABSTRACT

A client computer executes a client agent that determines the time between when an input is transmitted from a client computer to a remote server and when updated graphics are received from the remote server in response. The client agent interacts with a server agent that executes on the remote server. The client agent transmits an emulated keystroke to the server agent. In response, the server agent modifies a graphics object and composites the modified graphics object with a currently rendered frame. The client computer receives the frame and identifies the modified graphics object, indicating that the emulated keystroke was received by the remote server. The client agent then computes the time difference between when the emulated key- (Continued)

stroke was transmitted to the remote server and when the modified graphics object was detected and/or displayed at the client computer. This time difference indicates the responsiveness of the remote desktop implementation.

23 Claims, 9 Drawing Sheets

(56) References Cited

U.S. PATENT DOCUMENTS

| | | | | |
|---|---|---|---|---|
| 2013/0097426 | A1* | 4/2013 | Agrawal | G06F 3/0484 |
| | | | | 713/176 |
| 2015/0012644 | A1* | 1/2015 | Kubota | G06F 11/3419 |
| | | | | 709/224 |
| 2015/0084979 | A1* | 3/2015 | Bidarkar | G06F 3/14 |
| | | | | 345/593 |
| 2016/0373609 | A1* | 12/2016 | Kurkure | G06T 7/0002 |
| 2020/0298108 | A1* | 9/2020 | Phaneuf | A63F 13/31 |

OTHER PUBLICATIONS

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

* cited by examiner

TECHNIQUES FOR QUANTIFYING THE RESPONSIVENESS OF A REMOTE DESKTOP SESSION

BACKGROUND

A client computer implements a remote desktop session in conjunction with a remote server to allow a user to interact with one or more applications that execute on the remote server. The "responsiveness" of the remote desktop session generally relates to how quickly the remote server can perform processing operations during the remote desktop session in response to commands received from the client computer and transmit processed data back to the client computer for display. One approach to measuring the responsiveness of a remote desktop session is to measure the "ping" time between the client computer and the remote server. Ping time is generally understood to be the time needed for data or commands to travel between the client computer and the remote server. One problem with using ping time to measure responsiveness, however, is that ping time represents the speed of the network connection between the client computer and the remote server and does not account for the time required for the remote server to perform processing operations in response to commands received from the client computer. Consequently, ping time does not accurately quantify the responsiveness of a remote desktop session.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
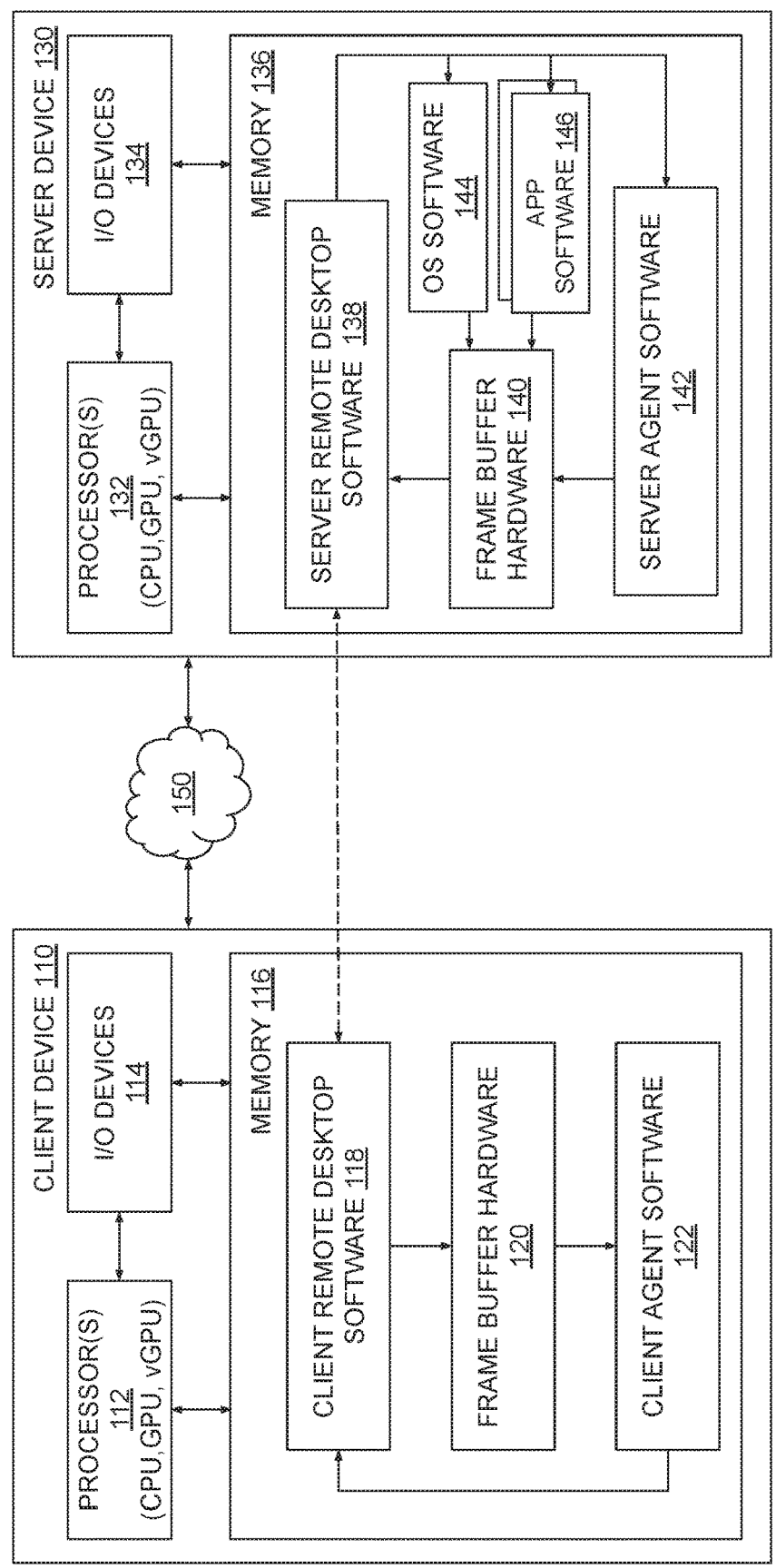
FIG. 1 illustrates a system configured to implement one or more aspects of various embodiments.

In the following description, numerous specific details are set forth to provide a more thorough understanding of the various embodiments. However, it will be apparent to one skilled in the art that the inventive concepts may be practiced without one or more of these specific details.

In various embodiments, in a remote desktop session, a client computer interacts with a remote server via a remote desktop. The remote desktop is a distributed software application that includes a client component and a server component. The client component executes on the client computer, and the server component executes on the remote server. In operation, the client component receives input from a user and transmits this input to the server component. The server component issues commands to an operating system (OS) and/or application(s) that execute on the remote server. The remote server renders graphics data to memory in response to these commands, and the server component then transmits the rendered graphics data to the client component. The client component updates the graphics displayed on the client computer based on the received graphics data.

In one embodiment, the "responsiveness" of a given remote desktop implementation may be considered to be the speed with which updated graphics data is displayed on the client computer in response to a user input received by the client computer. In effect, the responsiveness is considered to be the time that elapses between when the user input is received by the client computer and when the updated graphics data is displayed on the client computer. Virtual graphics processing units (vGPUs) can accelerate the speed with which a remote server renders graphics data, thereby increasing the responsiveness of a given remote desktop implementation.

A conventional approach to measuring the responsiveness of a remote desktop implementation is to measure the "ping" time between the client computer and the remote server. Ping time is the time needed for data or commands to travel between the client computer and the remote server. However, ping time represents the speed of the network connection between the client computer and the remote server and does not account for the processing operations performed by the remote server. Thus, ping time cannot be used to measure or quantify the performance gains achieved by implementing one or more vGPUs on the remote server.

In one embodiment, a client computer is configured to execute a lightweight client agent to provide a quantified measure of the "responsiveness" of a remote desktop implementation. In one embodiment, the client agent quantifies responsiveness by determining the total round-trip time between when an input is transmitted from the client computer to the remote server and when updated graphics data is received from the remote server in response to that input. In another embodiment, the client agent quantifies responsiveness by determining the total round-trip time between when an input is transmitted from the client computer to the remote server and when updated graphics data is received from the remote server in response to that input and displayed on a display device associated with the client computer.

In one embodiment, in operation, the client agent interacts with a lightweight server agent that executes on the remote server. The server agent generates a small graphics object (referred to as an "overlay") that includes eight rectangles of differing colors. The server agent composites the overlay with each frame that is rendered by, or on behalf of, the remote server. The client agent periodically transmits an emulated keystroke to the server agent. When the server agent receives the emulated keystroke from the client agent, the server agent permutes the colors of the eight rectangles included in the overlay and composites the permuted version of the overlay with the currently rendered frame. The composited frame is then transmitted to the client computer.

In one embodiment, when the client computer receives the composited frame that includes the permuted overlay, the client agent analyzes the overlay and detects that the colors of the eight rectangles included in the overlay have been permuted, indicating that the emulated keystroke was received by the remote server. The client agent then computes the time difference between when the emulated keystroke was transmitted to the remote server and when the permuted overlay was detected at the client computer and/or displayed via a client computer display. This time difference reflects the total round-trip time needed to transmit an input to the remote server and receive updated graphics data in response to that input, and is therefore a more direct measure of the responsiveness of the remote desktop implementation.

At least one technological advantage of the disclosed techniques relative to the prior art is that the responsiveness of a graphics-accelerated remote desktop implementation can be quantifiably determined relative to other remote desktop implementations that lack graphics processing acceleration. Accordingly, the benefits of offloading remote desktop graphics processing operations to a vGPU can be measured relative to performing remote desktop graphics processing operations via a CPU. Another technological advantage of the disclosed techniques relative to the prior art is that the responsiveness of remote desktop implementations that leverage different types of vGPUs to accelerate graphics processing operations can be quantified relative to one another. Thus, the disclosed techniques can provide a quantifiable metric to show that certain types of vGPUs outperform other types of vGPUs in remote desktop implementations. These technological advantages represent one or more technological advancements relative to prior art approaches.

System Overview

FIG. 1 illustrates a system configured to implement one or more aspects of various embodiments. As shown, in one embodiment, a system 100 includes a client device 110 and a server device 130 coupled together via a network 150. Client device 110 and/or server device 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

In one embodiment, as further shown, client device 110 includes processor(s) 112, input/output (I/O) devices 114, and a memory 116, coupled together. Processor(s) 112 include any technically feasible set of hardware units configured to process data and execute software applications. For example, processor(s) 112 could include one or more central processing units (CPUs), one or more graphics processing units (GPUs), and/or one or more virtual graphics processing units (vGPUs). In one embodiment, processor(s) 112 perform graphics processing operations via a CPU-emulated graphics processor. I/O devices 114 include any technically feasible set of devices configured to perform input and/or output operations, including, for example, a display device, a keyboard, a mouse, and a touchscreen, among others. Memory 116 includes any technically feasible storage media configured to store data and software applications, such as, for example, a hard disk, a random-access memory (RAM) module, and a read-only memory (ROM). Memory 116 includes client remote desktop software 118, frame buffer hardware 120, and client agent software 122. Client remote desktop software 118 is configured to interact with corresponding remote desktop software that executes on server device 130, as described in greater detail below.

In one embodiment, server device 130 includes processors(s) 132, I/O devices 134, and a memory 136, coupled together. Processors(s) 132 include any technically feasible set of hardware units configured to process data and execute software applications. For example, processor(s) 132 could include one or more central processing units (CPUs), one or more graphics processing units (GPUs), and/or one or more virtual graphics processing units (vGPUs). In one embodiment, processor(s) 132 perform graphics processing operations via a CPU-emulated graphics processor. I/O devices 134 include any technically feasible set of devices configured to perform input and/or output operations, such as a display device, a keyboard, a mouse, or a touchscreen, among others. Memory 136 includes any technically feasible storage media configured to store data and software applications, such as, for example, a hard disk, a RAM module, and a ROM. Memory 136 includes server remote desktop software 138, frame buffer hardware 140, server agent software 142, operating system (OS) software 144, and application (app) software 146.

In one embodiment, client remote desktop software 118 and server remote desktop software 138 interoperate as part of a distributed remote desktop implementation that allows a user of client device 110 to interact with OS software 144 and application software 146 executing on server device 130. In operation, the user inputs one or more commands to client remote desktop software 118 via I/O devices 114 and client remote desktop software 118 transmits the command(s) to server remote desktop software 138. Server remote desktop software 138 issues the commands to OS software 144 and/or application software 146, and in response, OS software 144 and/or application software 146 render updated frames of graphics data related to those commands to frame buffer hardware 140. Server remote desktop software 138 captures the updated frame(s) from frame buffer hardware 140, performs an encoding processes with the frame(s), and transmits the encoded updated frame(s) to client remote desktop software 118. Client remote desktop software 118, in turn, decodes the encoded, updated frame(s) and writes the updated frame(s) to frame buffer hardware 120 for subsequent display to the user.

In some embodiments, OS software 144 and/or application software 146 can be configured to offload graphics processing operations to any of processor(s) 132 to expedite the rendering, capturing, and/or encoding of updated frames. In such configurations, one or more of processor(s) 132 render updated frames of graphics data to frame buffer hardware 140. In one embodiment, frame buffer hardware 140 resides within a virtual display to which server device 130 is coupled. Offloading graphics processing operations in this manner may increase the speed with which frames of graphics data can be rendered, captured, and/or encoded and may increase the responsiveness of a remote desktop session implemented via client remote desktop software 118 and server remote desktop software 138.

In one embodiment, in conjunction with the above-described process, client agent software 122 and server agent software 142 interoperate in order to determine the total round-trip time between when commands are input to client remote desktop software 118 and when an updated frame of graphics data is received from server remote desktop software 138 and/or displayed at client device 110. In particular, client agent software 122 periodically transmits an emulated keystroke to server agent software 142. When server agent software 142 receives the emulated keystroke, server agent software 142 modifies a graphics object and causes a modified version of the graphics object to be composited with a recently-rendered frame stored in frame buffer hardware 140. Server remote desktop software 138 transmits an encoded version of the frame to client remote desktop software 118 to be written to frame buffer hardware 120. After decoding the received frame, client agent software 122 analyzes the frame and detects the permuted version of the graphics object, thereby indicating that server agent software 142 detected and responded to the emulated keystroke. Client agent software 122 determines the time difference between when the emulated keystroke was transmitted and when the frame was received and/or displayed. This time difference indicates the total round-trip time between when commands are input to client remote desktop software 118 and when an updated frame of graphics data is received from server remote desktop software 138 in response. This approach is described in greater detail below in conjunction with FIG. 2.

Software Architecture

Figure 2:
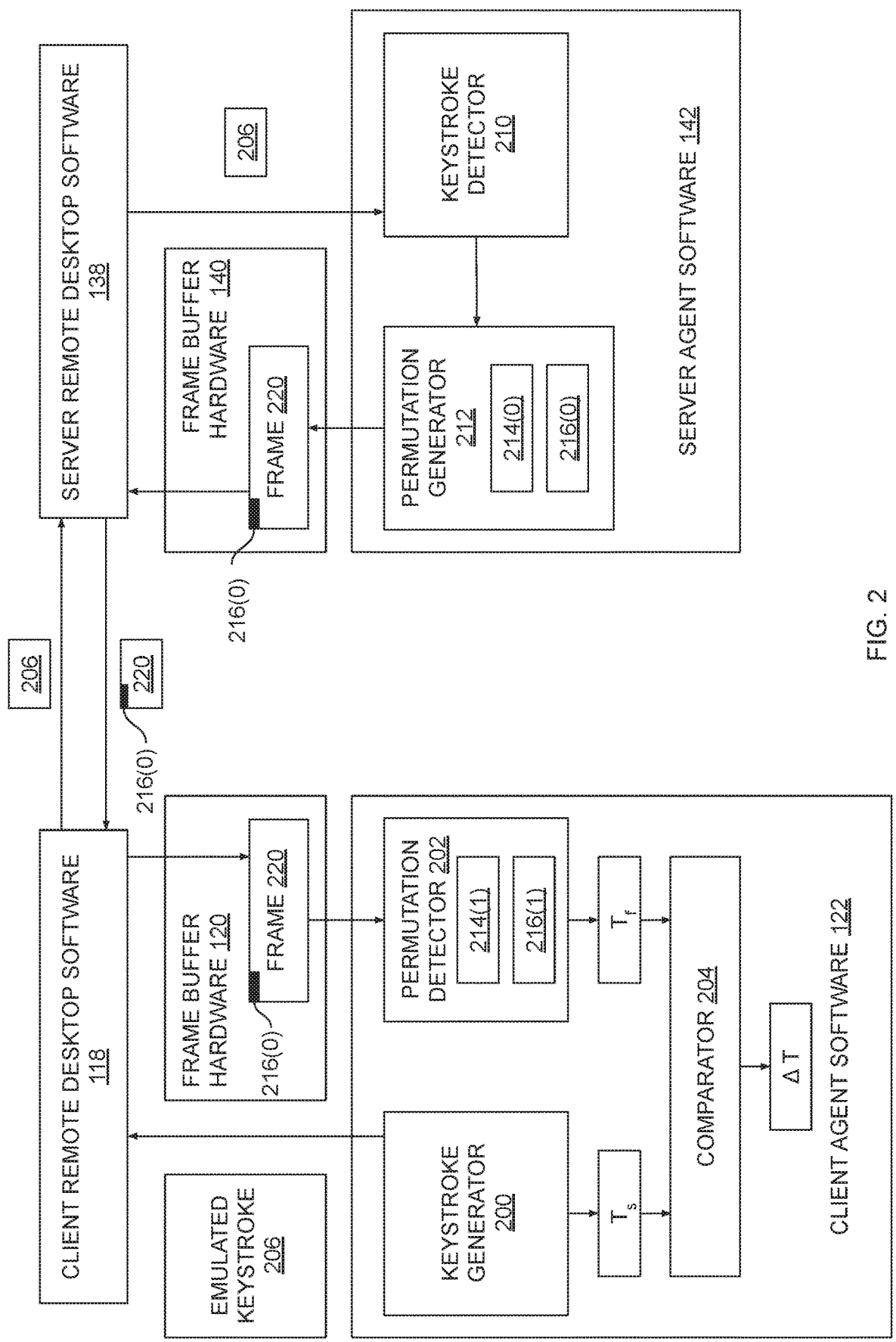
FIG. 2 is a more detailed illustration of the client agent and server agent of FIG. 1, according to various embodiments.

FIG. 2 is a more detailed illustration of the client agent and server agent of FIG. 1, according to various embodiments. As shown, in one embodiment, client agent software 122 includes a keystroke generator 200, a permutation detector 202, and a comparator 204, and server agent software 142 includes a permutation generator 212 and a keystroke detector 210.

In one embodiment, in operation, keystroke generator 200 transmits emulated keystroke 206 to client remote desktop software 118 and records time $T_s$ when emulated keystroke 206 is sent. Emulated keystroke 206 may be a hexadecimal keyboard code that is no longer used. For example, emulated keystroke 206 could be a hexadecimal code associated with a "vk_clear" command. As such, a keyboard coupled to client device 110 may not include a key corresponding to that keyboard code. Client remote desktop software 118 receives emulated keystroke 206 and forwards emulated keystroke 206 to server remote desktop software 138. Server remote desktop software 138 transmits emulated keystroke to keystroke detector 210. Keystroke detector 210 is configured to listen for the keyboard code associated with emulated keystroke 206. Keystroke detector 210 notifies permutation generator 212 when emulated keystroke 206 is received.

In one embodiment, permutation generator 212 stores a graphics object 214(0) that is composited with frames rendered to frame buffer hardware 140. As mentioned, OS software 144 and/or application software 146 of FIG. 1 can render frames to frame buffer and can do so with graphics processing acceleration provided by graphics processors (or emulated versions thereof) included in processor(s) 132. In response to receiving emulated keystroke 206, permutation generator 212 performs a permutation operation with graphics object 214(0) to generate graphics object 216(0). Graphics object 216(0) is a permuted version of graphics object 214(0). An example of how permutation generator 212 permutes graphics object is described below in conjunction with FIG. 3. Subsequently, permutation generator 212 causes graphics object 216(0) to be composited with a frame 220 that is recently rendered to frame buffer hardware 140. In one embodiment, graphics object 216(0) is composited with the upper-left corner of frame 220.

In one embodiment, server remote desktop software 138 encodes frame 220 via processor(s) 132 and then transmits the encoded version of frame 220 to client remote desktop software 118. In response, client remote desktop software 118 performs a decoding operation (e.g., via processor(s) 112) and then writes frame 220 to frame buffer hardware 120 for subsequent display to the user via a display device. Permutation detector 202 reads frame 220 from frame buffer hardware 120 and identifies one or more values encoded in graphics object 216(0). Permutation detector 202 stores graphics object values 214(1), which include color values similar to those included in graphics object 214(0), under nominal circumstances. Permutation detector 202 performs a cyclic shift operation with graphics object values 214(1) to generate graphics object values 216(1). The cyclic shift operation performed by permutation detector 202 is analogous to the permutation operation performed by permutation generator 212, except that the cyclic shift operation is applied to graphics object values 214(1) and not specifically applied to a graphics object. In one embodiment, graphics object values 214(1) and 216(1) can be implemented via graphics objects instead of graphics object values. Permutation detector 202 compares graphics object 216(0) to graphics object values 216(1) and determines if the values of graphics object 216(0) match graphics object values 216(1). An example of how permutation detector 202 determines matches between graphics objects and graphics object values is described below in conjunction with FIG. 4. When a match is determined, permutation detector 202 records time $T_f$.

In one embodiment, comparator 204 determines the difference between $T_s$ and $T_f$ to generate $\Delta T$. $\Delta T$ is a performance metric that represents the responsiveness of a remote desktop session conducted via client remote desktop software 118 and server remote desktop software 138. More specifically, $\Delta T$ represents the total round-trip time between when commands are issued to server remote desktop software 138 and updated graphics are received in response and/or displayed. Because $\Delta T$ captures the time needed to render, capture, and/or encode those updated frames, $\Delta T$ quantifies the performance benefits of offloading graphics processing operations to graphics processing hardware and/or software.

In one embodiment, the techniques described above can be implemented in an experimental setting to quantify the responsiveness of remote desktop sessions where graphics processing operations are offloaded to CPUs, GPUs, vGPUs and/or CPU-emulated GPUs relative to remote desktop sessions where graphics processing operations are performed via other rendering techniques. The techniques described above can further be implemented in experimental settings to quantify the responsiveness of different remote desktop sessions where graphics processing operations are offloaded to different types of processors. These techniques advantageously provide a more robust and accurate metric for measuring remote desktop session responsiveness compared to conventional approaches.

Permuting and Detecting Graphics Objects

Figure 3:
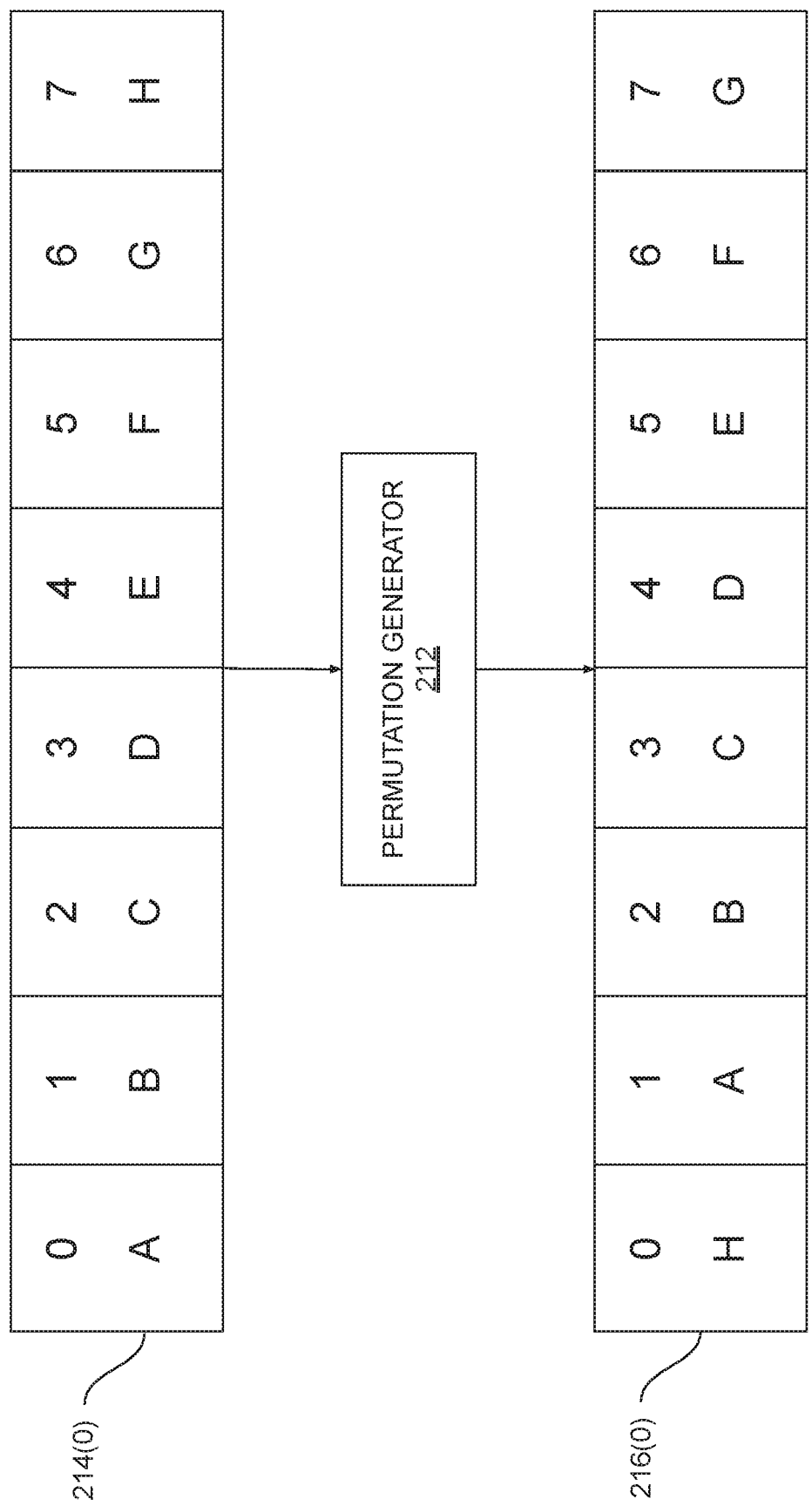
FIG. 3 is an example of how the permutation generator of FIG. 2 permutes a graphics object, according to various embodiments.

FIG. 3 is an example of how the permutation generator of FIG. 2 permutes a graphics object, according to various embodiments. As shown, in one embodiment, graphics object 214 is an array of rectangles that reside at positions 0 through 7. Each rectangle stores a unique value. In the example shown, each rectangle stores a unique character, although in practice each rectangle can have a unique color value or any other technically feasible type of identifier. Permutation generator 212 permutes graphics object 214 to generate graphics object 216. In so doing, permutation generator 212 advances each value to the right and moves the value at position 7 to position 0.

Figure 4:
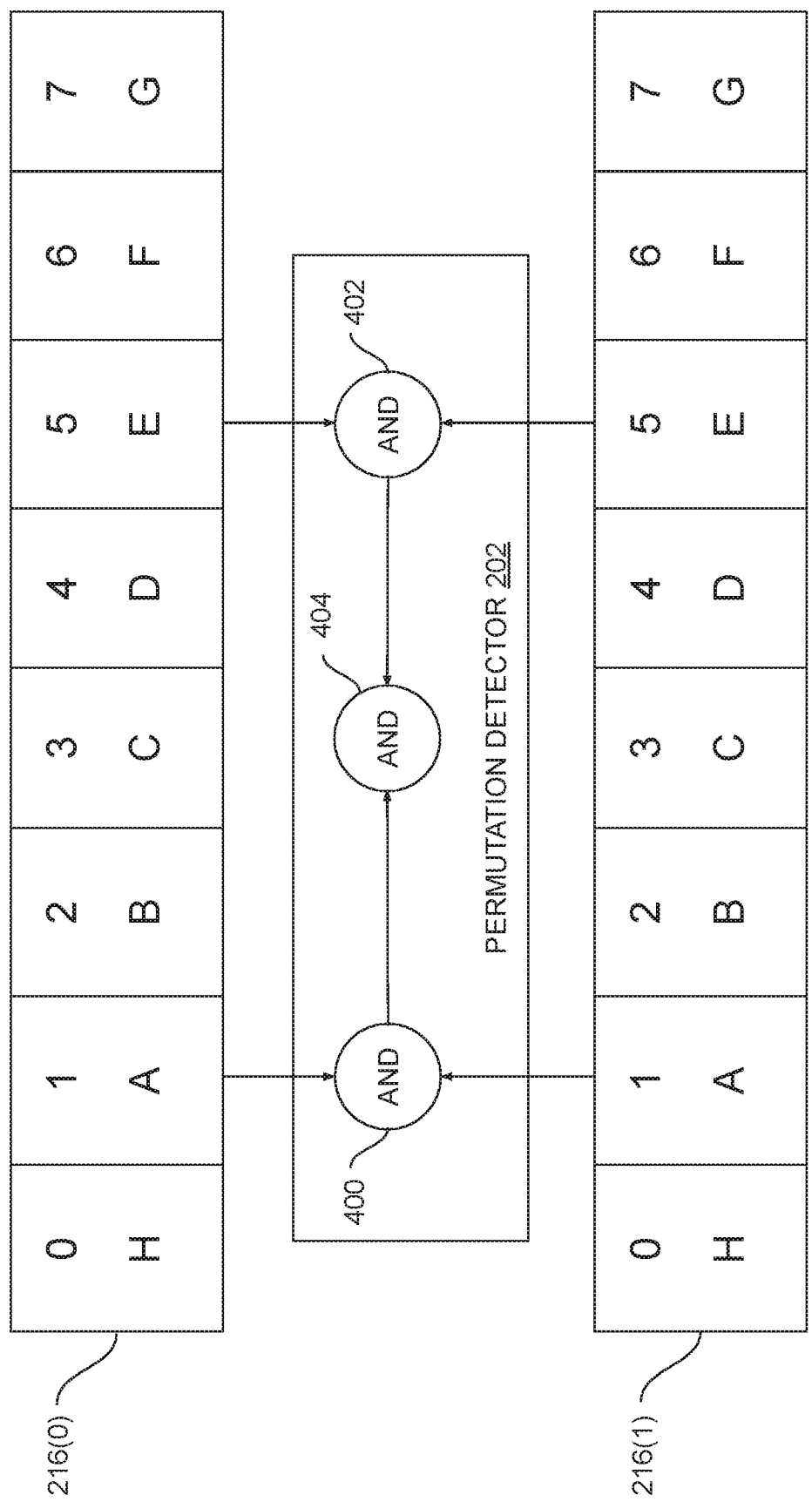
FIG. 4 is an example of how the permutation detector of FIG. 2 detects a permuted version of a graphics object, according to various embodiments.

FIG. 4 is an example of how the permutation detector of FIG. 2 detects a permuted version of a graphics object, according to various embodiments. As shown, in one embodiment, permutation detector 202 compares specific elements of graphics object 216(0) with corresponding values stored on graphics object values 216(1) to determine whether those values match. In particular, permutation detector 202 implements AND operation 400 to compare the values stored at position 1 in graphics object 216(0) and in graphics object values 216(1) to one another. Permutation detector 202 also implements AND operation 402 to compare the values stored at position 5 in graphics object 216(0) and in graphics object values 216(1) to one another. Permutation detector 202 implements AND 404 to compare the results of AND operations 400 and 402. If AND 404 indicates that graphics object 216(0) includes the same values as graphics object values 216(1) at positions 1 and 5, then a match is detected, indicating that graphics object 216(0) is a permutation of graphics object 214(0). Performing multiple comparisons in the manner described can reduce or eliminate the incidence of false positives that can arise in embodiments where graphics objects 216 include color values that may be similar to color values included in frame 220.

Referring generally to FIG. 3-4, persons skilled in the art will understand that the foregoing examples are presented for clarity and not meant to limit the scope of the present embodiments. As a general matter, any technically feasible approach to modifying or permuting graphics objects can be applied, and any technically feasible approach to detecting modified or permuted graphics objects can equally be applied.

Client and Server Agent Processes

Figure 5:
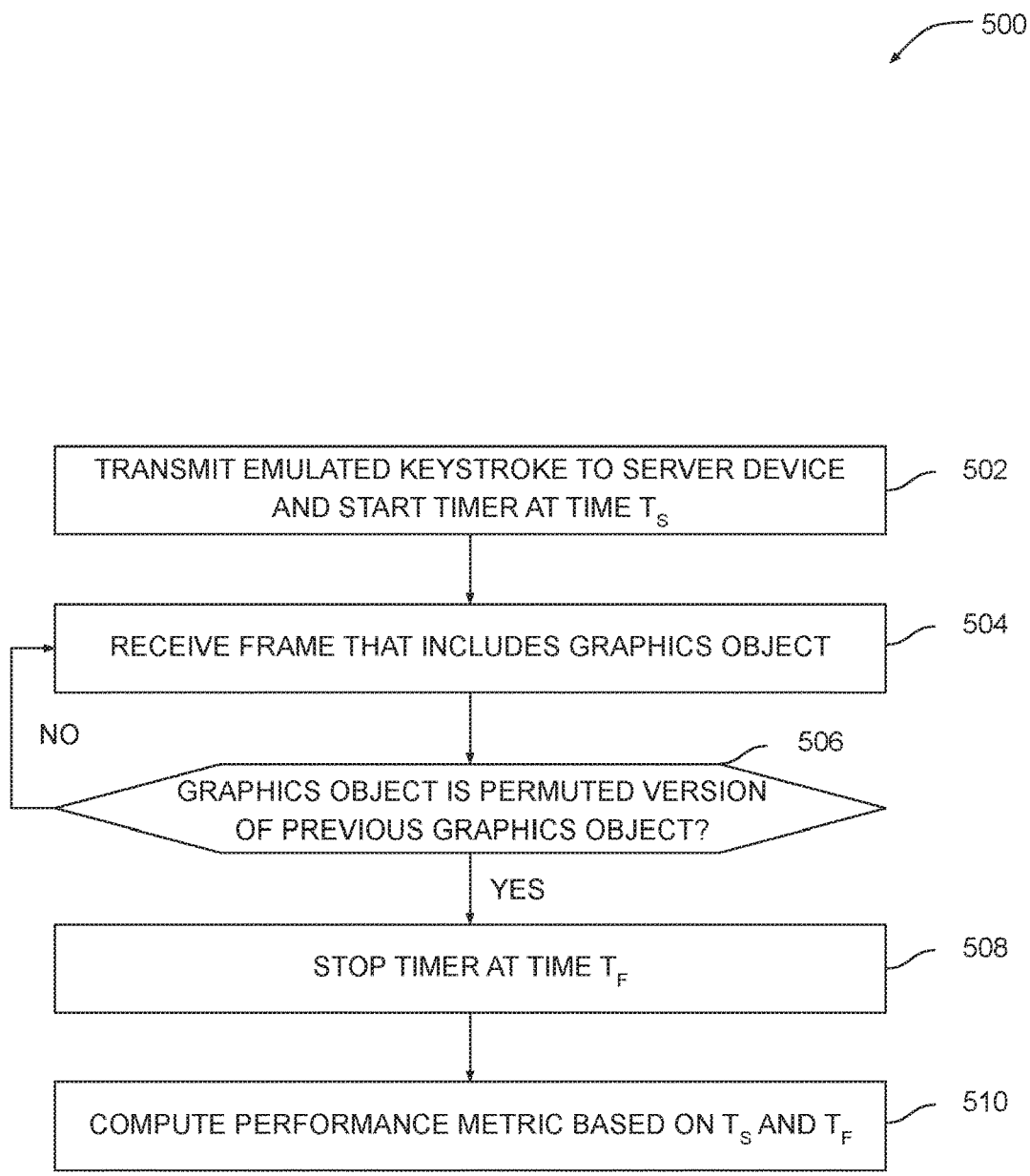
FIG. 5 is a flow diagram of method steps for quantifying the responsiveness of a server remote desktop, according to various embodiments.

FIG. 5 is a flow diagram of method steps for quantifying the responsiveness of a server remote desktop, according to various embodiments. Although the method steps are described in conjunction with the systems of FIGS. 1-4, persons skilled in the art will understand that any system configured to perform the method steps in any order falls within the scope of the present embodiments.

As shown, a method 500 begins at step 502, where keystroke generator 200 within client agent software 122 of FIG. 2 transmits an emulated keystroke to server device 130 and starts a timer at time T. In one embodiment, the emulated keystroke corresponds to a keyboard code that is no longer used, such as "vk_clear." Keystroke generator 200 transmits the emulated keystroke to server device 130 via client remote desktop software 118.

At step 504, permutation detector 202 within client agent software 122 identifies a graphics object within a received frame. In one embodiment, client remote desktop software 118 receives and decodes the frame and then writes the frame into frame buffer hardware 120. Permutation detector 202 then reads the frame from frame buffer hardware 120 and analyzes the frame to identify the graphics object. In one embodiment, the identified graphics object is a series of rectangles, such as that shown in FIGS. 3-4, and is positioned in the upper-left corner of the frame.

At step 506, permutation detector 202 determines whether the identified graphics object is a permuted version of a previous graphics object. In one embodiment, permutation detector 202 stores graphics object values derived from a previously received graphics object and computes a cyclic shift of those values. Based on a comparison between the identified graphics object and the cyclically-shifted graphics object values, permutation detector 202 determines whether the identified graphics object is a permuted version of the previous graphics object. An approach to detecting permuted versions of graphics objects is described by way of example above in conjunction with FIG. 4. If, at step 506, client agent software 122 determines that the graphics object is not a permuted version of the stored graphics object, then the method 500 returns to step 504. Otherwise, the method 500 proceeds to step 508.

At step 508, client agent software 122 stops the timer previously set via step 502 at time $T_f$. In various embodiments, client agent software 122 includes any technically feasible type of counter. At step 510, client agent software 122 computes a performance metric based on $T_s$ and $T_f$. In one embodiment, client agent computes a time delta between $T_s$ and $T_f$ to indicate the total round-trip time needed for updated graphics to be received from server device 130 in response to the emulated keystroke transmitted at step 502. This time delta reflects the benefits of offloading graphics processing operations to processor(s) 132.

Figure 6:
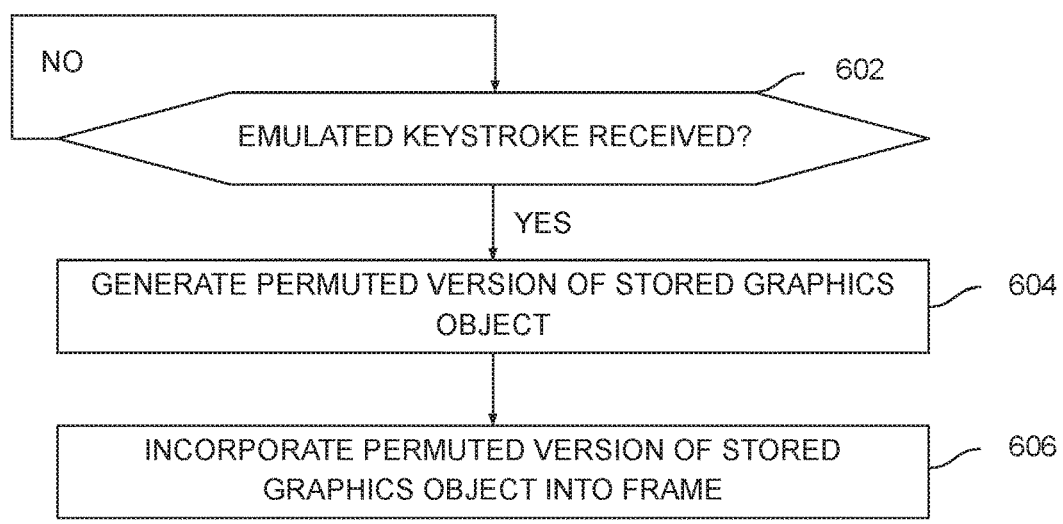
FIG. 6 is a flow diagram of method steps for generating a permuted version of a graphics object, according to various embodiments.

FIG. 6 is a flow diagram of method steps for generating a permuted version of a graphics object, according to various embodiments. Although the method steps are described in conjunction with the systems of FIGS. 1-4, persons skilled in the art will understand that any system configured to perform the method steps in any order falls within the scope of the present embodiments.

As shown, a method 600 begins at step 602, where server agent software 142 of FIG. 2 determines whether an emulated keystroke is received. Server agent software 142 interoperates with server remote desktop application software 138 to obtain inputs that are received by server remote desktop software 138 from client remote desktop software 118. Server agent software 142 is configured to wait at step 602 until the emulated keystroke is received. When the emulated keystroke is received, the method 600 proceeds to step 604.

At step 604, server agent software 142 generates a permuted version of a stored graphics object. In one embodiment, the stored graphics object is a grid of rectangles. To permute the grid of rectangles, server agent software 142 advances the value of each rectangle to the right and moves the right-most rectangle to the left-most position, as described above in conjunction with FIG. 3. Each rectangle can be associated with any technically feasible form of identifier, including a value, a pixel value, a character, and so forth.

At step 606, server agent software 142 causes the permuted version of the graphics object to be composited with a recently-rendered frame of graphics data stored in frame buffer hardware 140. The recently-rendered frame of graphics data could be generated, for example, by processor(s) 132 of FIG. 1 when graphics acceleration is enabled. The composited frame is subsequently encoded and sent to client remote desktop software 118 by server remote desktop software 138.

Referring generally to FIGS. 5 and 6, client agent software 122 and server agent software 142 perform the methods 500 and 600, respectively, in conjunction with one another in order to determine the total round-trip time needed to transmit commands to server device 130 and receive and/or display updated graphics in response. The total round-trip time, or ΔT, can be used to measure the performance benefits of offloading graphics processing operations, including rendering frames, capturing frames, and encoding frames, to processor(s) 132. An exemplary computer system that can be used to implement client device 110 and/or server device 130 is described below in conjunction with FIGS. 7-9. In one embodiment, the exemplary computer system described below implements the functionalities of both client device 110 and server device 130/

Exemplary Hardware Architecture

Figure 7:
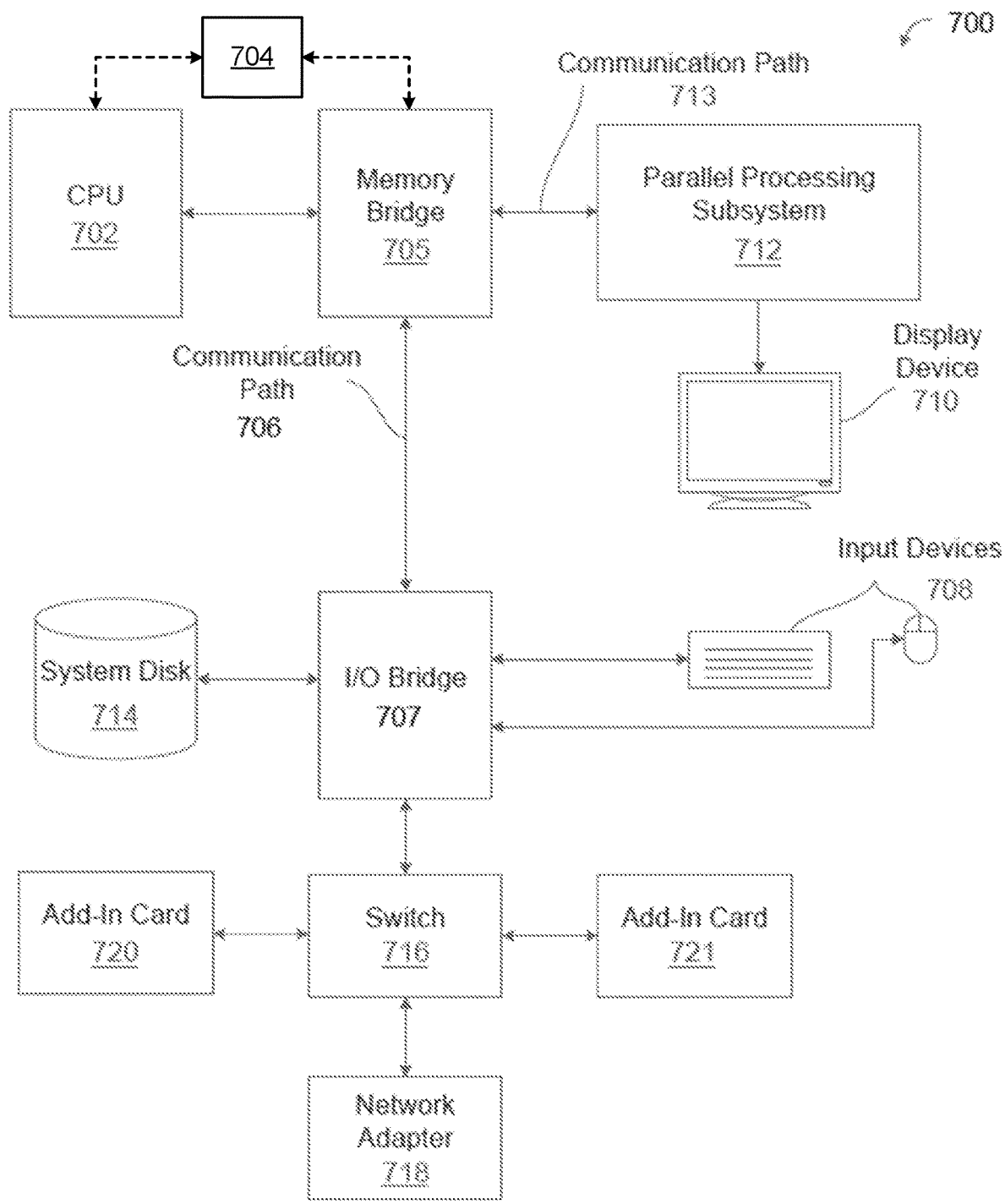
FIG. 7 is a block diagram illustrating a computer system configured to implement one or more aspects of various embodiments.

FIG. 7 is a block diagram illustrating a computer system 700 configured to implement one or more aspects of various embodiments. In some embodiments, computer system 700 is a server machine operating in a data center or a cloud computing environment that provides scalable computing resources as a service over a network.

In various embodiments, computer system 700 includes, without limitation, a central processing unit (CPU) 702 and a system memory 704 coupled to a parallel processing subsystem 712 via a memory bridge 705 and a communication path 713. Memory bridge 705 is further coupled to an I/O (input/output) bridge 707 via a communication path 706, and I/O bridge 707 is, in turn, coupled to a switch 716.

In one embodiment, I/O bridge 707 is configured to receive user input information from optional input devices 708, such as a keyboard or a mouse, and forward the input information to CPU 702 for processing via communication path 706 and memory bridge 705. In some embodiments, computer system 700 may be a server machine in a cloud computing environment. In such embodiments, computer system 700 may not have input devices 708. Instead, computer system 700 may receive equivalent input information by receiving commands in the form of messages transmitted over a network and received via the network adapter 718. In one embodiment, switch 716 is configured to provide connections between I/O bridge 707 and other components of the computer system 700, such as a network adapter 718 and various add-in cards 720 and 721.

In one embodiment, I/O bridge 707 is coupled to a system disk 714 that may be configured to store content and applications and data for use by CPU 702 and parallel processing subsystem 712. In one embodiment, system disk 714 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 707 as well.

In various embodiments, memory bridge 705 may be a Northbridge chip, and I/O bridge 707 may be a Southbridge chip. In addition, communication paths 706 and 713, as well as other communication paths within computer system 700, may be implemented using any technically suitable protocols, including, without limitation, AGP (Accelerated Graphics Port), HyperTransport, or any other bus or point-to-point communication protocol known in the art.

In some embodiments, parallel processing subsystem 712 comprises a graphics subsystem that delivers pixels to an optional display device 710 that may be any conventional cathode ray tube, liquid crystal display, light-emitting diode display, or the like. In such embodiments, the parallel processing subsystem 712 incorporates circuitry optimized for graphics and video processing, including, for example, video output circuitry. As described in greater detail below in conjunction with FIGS. 8 and 9, such circuitry may be incorporated across one or more parallel processing units (PPUs), also referred to herein as parallel processors, included within parallel processing subsystem 712. In other embodiments, the parallel processing subsystem 712 incorporates circuitry optimized for general purpose and/or compute processing. Again, such circuitry may be incorporated across one or more PPUs included within parallel processing subsystem 712 that are configured to perform such general purpose and/or compute operations. In yet other embodiments, the one or more PPUs included within parallel processing subsystem 712 may be configured to perform graphics processing, general purpose processing, and compute processing operations. System memory 704 includes at least one device driver configured to manage the processing operations of the one or more PPUs within parallel processing subsystem 712.

In various embodiments, parallel processing subsystem 712 may be integrated with one or more of the other elements of FIG. 7 to form a single system. For example, parallel processing subsystem 712 may be integrated with CPU 702 and other connection circuitry on a single chip to form a system on chip (SoC).

In one embodiment, CPU 702 is the master processor of computer system 700, controlling and coordinating operations of other system components. In one embodiment, CPU 702 issues commands that control the operation of PPUs. In some embodiments, communication path 713 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 702, and the number of parallel processing subsystems 712, may be modified as desired. For example, in some embodiments, system memory 704 could be connected to CPU 702 directly rather than through memory bridge 705, and other devices would communicate with system memory 704 via memory bridge 705 and CPU 702. In other embodiments, parallel processing subsystem 712 may be connected to I/O bridge 707 or directly to CPU 702, rather than to memory bridge 705. In still other embodiments, I/O bridge 707 and memory bridge 705 may be integrated into a single chip instead of existing as one or more discrete devices. Lastly, in certain embodiments, one or more components shown in FIG. 7 may not be present. For example, switch 716 could be eliminated, and network adapter 718 and add-in cards 720, 721 would connect directly to I/O bridge 707.

Figure 8:
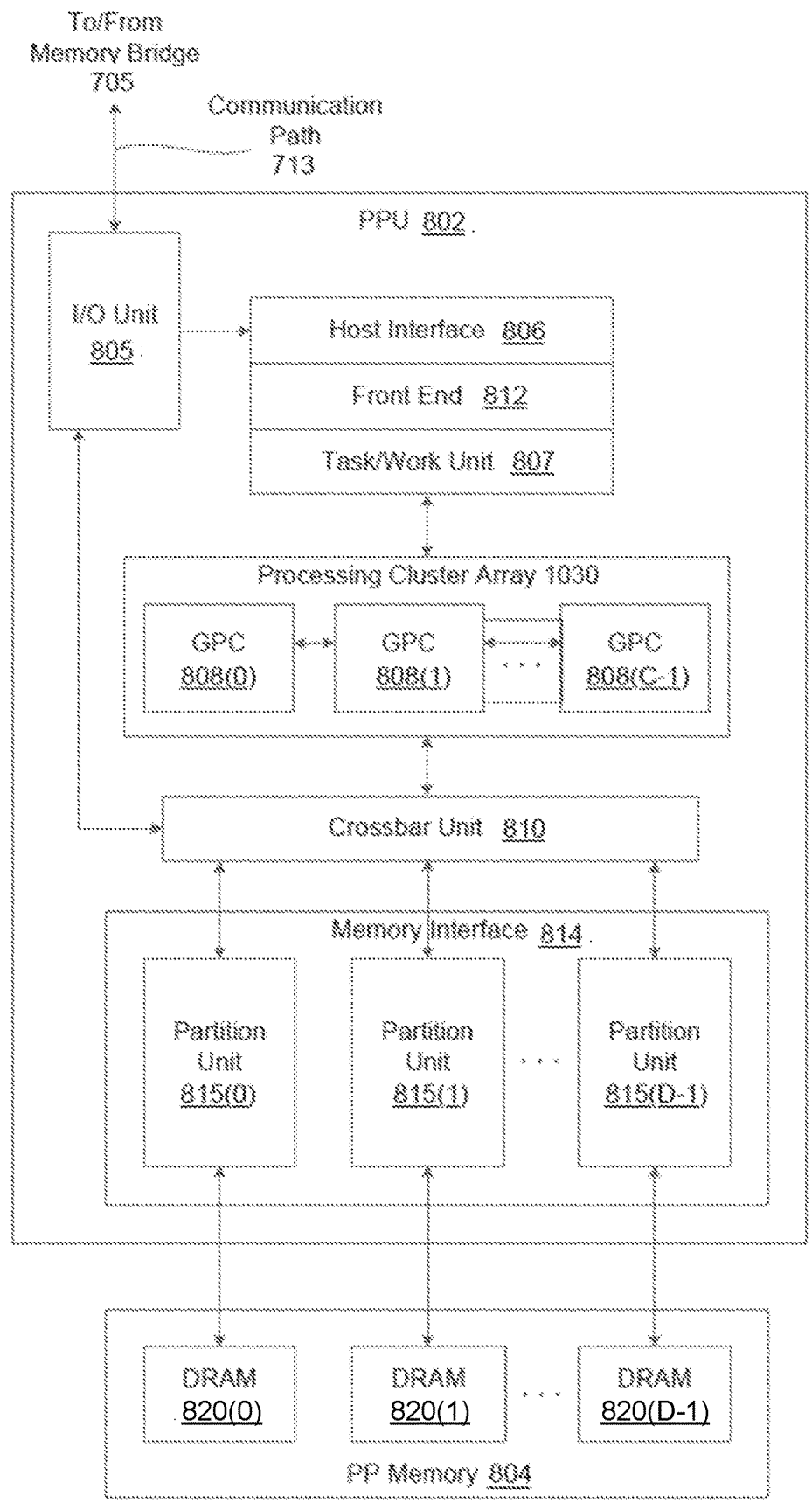
FIG. 8 is a block diagram of a parallel processing unit (PPU) included in the parallel processing subsystem of FIG. 7, according to various embodiments.

FIG. 8 is a block diagram of a parallel processing unit (PPU) 802 included in the parallel processing subsystem 712 of FIG. 7, according to various embodiments. Although FIG. 8 depicts one PPU 802, as indicated above, parallel processing subsystem 712 may include any number of PPUs 802. As shown, PPU 802 is coupled to a local parallel processing (PP) memory 804. PPU 802 and PP memory 804 may be implemented using one or more integrated circuit devices, such as programmable processors, application specific integrated circuits (ASICs), or memory devices, or in any other technically feasible fashion.

In some embodiments, PPU 802 comprises a graphics processing unit (GPU) that may be configured to implement a graphics rendering pipeline to perform various operations related to generating pixel data based on graphics data supplied by CPU 702 and/or system memory 704. When processing graphics data, PP memory 804 can be used as graphics memory that stores one or more conventional frame buffers and, if needed, one or more other render targets as well. Among other things, PP memory 804 may be used to store and update pixel data and deliver final pixel data or display frames to an optional display device 710 for display. In some embodiments, PPU 802 also may be configured for general-purpose processing and compute operations. In some embodiments, computer system 700 may be a server machine in a cloud computing environment. In such embodiments, computer system 700 may not have a display device 710. Instead, computer system 700 may generate equivalent output information by transmitting commands in the form of messages over a network via the network adapter 718.

In some embodiments, CPU 702 is the master processor of computer system 700, controlling and coordinating operations of other system components. In one embodiment, CPU 702 issues commands that control the operation of PPU 802. In some embodiments, CPU 702 writes a stream of commands for PPU 802 to a data structure (not explicitly shown in either FIG. 7 or FIG. 8) that may be located in system memory 704, PP memory 804, or another storage location accessible to both CPU 702 and PPU 802. A pointer to the data structure is written to a command queue, also referred to herein as a pushbuffer, to initiate processing of the stream of commands in the data structure. In one embodiment, the PPU 802 reads command streams from the command queue and then executes commands asynchronously relative to the operation of CPU 702. In embodiments where multiple pushbuffers are generated, execution priorities may be specified for each pushbuffer by an application program via device driver to control scheduling of the different pushbuffers.

In one embodiment, PPU 802 includes an I/O (input/output) unit 805 that communicates with the rest of computer system 700 via the communication path 713 and memory bridge 705. In one embodiment, I/O unit 805 generates packets (or other signals) for transmission on communication path 713 and also receives all incoming packets (or other signals) from communication path 713, directing the incoming packets to appropriate components of PPU 802. For example, commands related to processing tasks may be directed to a host interface 806, while commands related to memory operations (e.g., reading from or writing to PP memory 804) may be directed to a crossbar unit 810. In one embodiment, host interface 806 reads each command queue and transmits the command stream stored in the command queue to a front end 812.

As mentioned above in conjunction with FIG. 7, the connection of PPU 802 to the rest of computer system 700 may be varied. In some embodiments, parallel processing subsystem 712, which includes at least one PPU 802, is implemented as an add-in card that can be inserted into an expansion slot of computer system 700. In other embodiments, PPU 802 can be integrated on a single chip with a bus bridge, such as memory bridge 705 or I/O bridge 707. Again, in still other embodiments, some or all of the elements of PPU 802 may be included along with CPU 702 in a single integrated circuit or system of chip (SoC).

In one embodiment, front end 812 transmits processing tasks received from host interface 806 to a work distribution unit (not shown) within task/work unit 807. In one embodiment, the work distribution unit receives pointers to processing tasks that are encoded as task metadata (TMD) and stored in memory. The pointers to TMDs are included in a command stream that is stored as a command queue and received by the front end unit 812 from the host interface 806. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 807 receives tasks from the front end 812 and ensures that GPCs 808 are configured to a valid state before the processing task specified by each one of the TMDs is initiated. A priority may be specified for each TMD that is used to schedule the execution of the processing task. Processing tasks also may be received from the processing cluster array 830. Optionally, the TMD may include a parameter that controls whether the TMD is added to the head or the tail of a list of processing tasks (or to a list of pointers to the processing tasks), thereby providing another level of control over execution priority.

In one embodiment, PPU 802 implements a highly parallel processing architecture based on a processing cluster array 830 that includes a set of C general processing clusters (GPCs) 808, where C≥1. Each GPC 808 is capable of executing a large number (e.g., hundreds or thousands) of threads concurrently, where each thread is an instance of a program. In various applications, different GPCs 808 may be allocated for processing different types of programs or for performing different types of computations. The allocation of GPCs 808 may vary depending on the workload arising for each type of program or computation.

In one embodiment, memory interface 814 includes a set of D of partition units 815, where D≥1. Each partition unit 815 is coupled to one or more dynamic random access memories (DRAMs) 820 residing within PPM memory 804. In some embodiments, the number of partition units 815 equals the number of DRAMs 820, and each partition unit 815 is coupled to a different DRAM 820. In other embodiments, the number of partition units 815 may be different than the number of DRAMs 820. Persons of ordinary skill in the art will appreciate that a DRAM 820 may be replaced with any other technically suitable storage device. In operation, various render targets, such as texture maps and frame buffers, may be stored across DRAMs 820, allowing partition units 815 to write portions of each render target in parallel to efficiently use the available bandwidth of PP memory 804.

In one embodiment, a given GPC 808 may process data to be written to any of the DRAMs 820 within PP memory 804. In one embodiment, crossbar unit 810 is configured to route the output of each GPC 808 to the input of any partition unit 815 or to any other GPC 808 for further processing. GPCs 808 communicate with memory interface 814 via crossbar unit 810 to read from or write to various DRAMs 820. In some embodiments, crossbar unit 810 has a connection to I/O unit 805, in addition to a connection to PP memory 804 via memory interface 814, thereby enabling the processing cores within the different GPCs 808 to communicate with system memory 704 or other memory not local to PPU 802. In the embodiment of FIG. 8, crossbar unit 810 is directly connected with I/O unit 805. In various embodiments, crossbar unit 810 may use virtual channels to separate traffic streams between the GPCs 808 and partition units 815.

In one embodiment, GPCs 808 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 802 is configured to transfer data from system memory 704 and/or PP memory 804 to one or more on-chip memory units, process the data, and write result data back to system memory 704 and/or PP memory 804. The result data may then be accessed by other system components, including CPU 702, another PPU 802 within parallel processing subsystem 712, or another parallel processing subsystem 712 within computer system 700.

In one embodiment, any number of PPUs 802 may be included in a parallel processing subsystem 712. For example, multiple PPUs 802 may be provided on a single add-in card, or multiple add-in cards may be connected to communication path 713, or one or more of PPUs 802 may be integrated into a bridge chip. PPUs 802 in a multi-PPU system may be identical to or different from one another. For example, different PPUs 802 might have different numbers of processing cores and/or different amounts of PP memory 804. In implementations where multiple PPUs 802 are present, those PPUs may be operated in parallel to process data at a higher throughput than is possible with a single PPU 802. Systems incorporating one or more PPUs 802 may be implemented in a variety of configurations and form factors, including, without limitation, desktops, laptops, handheld personal computers or other handheld devices, servers, workstations, game consoles, embedded systems, and the like.

Figure 9:
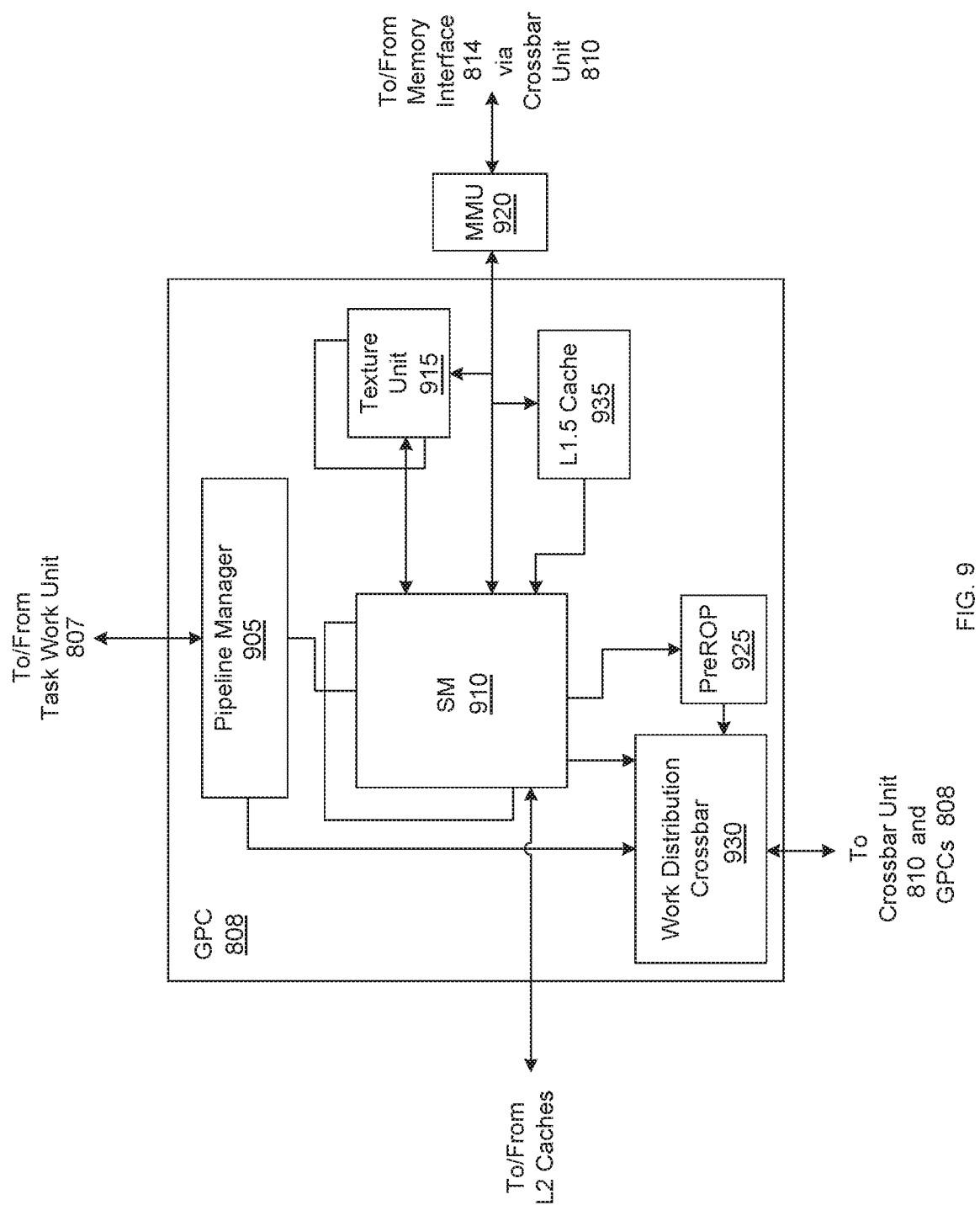
FIG. 9 is a block diagram of a general processing cluster (GPC) included in the parallel processing unit (PPU) of FIG. 8, according to various embodiments.

FIG. 9 is a block diagram of a general processing cluster (GPC) 808 included in the parallel processing unit (PPU) 802 of FIG. 8, according to various embodiments. As shown, the GPC 808 includes, without limitation, a pipeline manager 905, one or more texture units 915, a preROP unit 925, a work distribution crossbar 930, and an L1.5 cache 935.

In one embodiment, GPC 808 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 808. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 808 is controlled via a pipeline manager 905 that distributes processing tasks received from a work distribution unit (not shown) within task/work unit 807 to one or more streaming multiprocessors (SMs) 910. Pipeline manager 905 may also be configured to control a work distribution crossbar 930 by specifying destinations for processed data output by SMs 910.

In various embodiments, GPC 808 includes a set of M of SMs 910, where M≥1. Also, each SM 910 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 910 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 910 includes multiple processing cores. In one embodiment, the SM 910 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 910 provide a computing platform capable of delivering performance required for deep neural network-based artificial intelligence and machine learning applications.

In various embodiments, each SM 910 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 910 also comprises multiple load/store units (LSUs) that implement load and store operations between the shared memory/L1 cache and register files internal to the SM 910.

In one embodiment, each SM 910 is configured to process one or more thread groups. As used herein, a "thread group" or "warp" refers to a group of threads concurrently executing the same program on different input data, with one thread of the group being assigned to a different execution unit within an SM 910. A thread group may include fewer threads than the number of execution units within the SM 910, in which case some of the execution may be idle during cycles when that thread group is being processed. A thread group may also include more threads than the number of execution units within the SM 910, in which case processing may occur over consecutive clock cycles. Since each SM 910 can support up to G thread groups concurrently, it follows that up to G*M thread groups can be executing in GPC 808 at any given time.

Additionally, in one embodiment, a plurality of related thread groups may be active (in different phases of execution) at the same time within an SM 910. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 910, and m is the number of thread groups simultaneously active within the SM 910. In some embodiments, a single SM 910 may simultaneously support multiple CTAs, where such CTAs are at the granularity at which work is distributed to the SMs 910.

In one embodiment, each SM 910 contains a level one (L1) cache or uses space in a corresponding L1 cache outside of the SM 910 to support, among other things, load and store operations performed by the execution units. Each SM 910 also has access to level two (L2) caches (not shown) that are shared among all GPCs 808 in PPU 802. The L2 caches may be used to transfer data between threads. Finally, SMs 910 also have access to off-chip "global" memory, which may include PP memory 804 and/or system memory 704. It is to be understood that any memory external to PPU 802 may be used as global memory. Additionally, as shown in FIG. 9, a level one-point-five (L1.5) cache 935 may be included within GPC 808 and configured to receive and hold data requested from memory via memory interface 814 by SM 910. Such data may include, without limitation, instructions, uniform data, and constant data. In embodiments having multiple SMs 910 within GPC 808, the SMs 910 may beneficially share common instructions and data cached in L1.5 cache 935.

In one embodiment, each GPC 808 may have an associated memory management unit (MMU) 920 that is configured to map virtual addresses into physical addresses. In various embodiments, MMU 920 may reside either within GPC 808 or within the memory interface 814. The MMU 920 includes a set of page table entries (PTEs) used to map a virtual address to a physical address of a tile or memory page and optionally a cache line index. The MMU 920 may include address translation lookaside buffers (TLB) or caches that may reside within SMs 910, within one or more L1 caches, or within GPC 808.

In one embodiment, in graphics and compute applications, GPC 808 may be configured such that each SM 910 is coupled to a texture unit 915 for performing texture mapping operations, such as determining texture sample positions, reading texture data, and filtering texture data.

In one embodiment, each SM 910 transmits a processed task to work distribution crossbar 930 in order to provide the processed task to another GPC 808 for further processing or to store the processed task in an L2 cache (not shown), parallel processing memory 804, or system memory 704 via crossbar unit 810. In addition, a pre-raster operations (preROP) unit 925 is configured to receive data from SM 910, direct data to one or more raster operations (ROP) units within partition units 815, perform optimizations for color blending, organize pixel color data, and perform address translations.

It will be appreciated that the architecture described herein is illustrative and that variations and modifications are possible. Among other things, any number of processing units, such as SMs 910, texture units 915, or preROP units 925, may be included within GPC 808. Further, as described above in conjunction with FIG. 8, PPU 802 may include any number of GPCs 808 that are configured to be functionally similar to one another so that execution behavior does not depend on which GPC 808 receives a particular processing task. Further, each GPC 808 operates independently of the other GPCs 808 in PPU 802 to execute tasks for one or more application programs.

In sum, in one embodiment, a client computer is configured to execute a client agent that determines the total round-trip time between when an input is transmitted from a client computer to a remote server and when updated graphics data is received from the remote server in response to that input. The client agent interacts with a server agent that executes on the remote server. The server agent generates a graphics object and composites the graphics object with each frame that is rendered at the remote server. The client agent periodically transmits an emulated keystroke to the server agent. When the server agent receives the emulated keystroke from the client agent, the server agent modifies the graphics object and composites the modified graphics object with a currently rendered frame. The composited frame is then transmitted to the client computer. When the client computer receives the composited frame, the client agent identifies the modified graphics object, indicating that the emulated keystroke was received by the remote server. The client agent then computes the time difference between when the emulated keystroke was transmitted to the remote server and when the modified graphics object was detected at the client computer. This time difference reflects the total round-trip time needed to transmit an input to the remote server and receive updated graphics data in response to that input, and is therefore a more direct measure of the responsiveness of the remote desktop implementation.

At least one technological advantage of the disclosed techniques relative to the prior art is that the responsiveness of a graphics-accelerated remote desktop implementation can be quantifiably determined relative to other remote desktop implementations that lack graphics processing acceleration. Accordingly, the benefits of offloading remote desktop graphics processing operations to a vGPU can be measured relative to performing remote desktop graphics processing operations via a CPU. Another technological advantage of the disclosed techniques relative to the prior art is that the responsiveness of remote desktop implementations that leverage different types of vGPUs to accelerate graphics processing operations can be quantified relative to one another. Thus, the disclosed techniques can provide a quantifiable metric to show that certain types of vGPUs outperform other types of vGPUs in remote desktop implementations. These technological advantages represent one or more technological advancements relative to prior art approaches.

1. Some embodiments include a computer-implemented method, comprising transmitting an emulated keystroke to a server machine, receiving a modified graphics object from the server machine in response to the emulated keystroke, and computing a performance metric based on the emulated keystroke and the modified graphics object.

2. The computer-implemented method of clause 1, wherein the modified graphics object comprises a plurality of rectangles, wherein each rectangle in the plurality of rectangles includes a different color value.

3. The computer-implemented method of any of clauses 1-2, further comprising comparing at least one value included in the modified graphics object to a corresponding value included in a set of graphics object values to determine that the modified graphics object matches the set of graphics object values.

4. The computer-implemented method of any of clauses 1-3, further comprising determining a first point in time when the emulated keystroke is transmitted to the server machine, and determining a second point in time when the modified graphics object is received from the server machine.

5. The computer-implemented method of any of clauses 1-4, wherein computing the performance metric comprises determining a time difference between the first point in time and the second point in time.

6. The computer-implemented method of any of clauses 1-5, wherein the emulated keystroke corresponds to a hexadecimal code associated with an nk_clear keyboard command.

7. The computer-implemented method of any of clauses 1-6, further comprising in response to receiving the emulated keystroke, modifying a graphics object to generate the modified graphics object, compositing the modified graphics object with a frame of rendered graphics data to generate a composited frame of graphics data, and transmitting the composited frame of graphics data to a client machine.

8. The computer-implemented method of any of clauses 1-7, wherein the graphics object comprises an array of values, and wherein modifying the graphics object comprises permuting the array of values.

9. The computer-implemented method of any of clauses 1-8, wherein permuting the array of values comprises moving a first value included in the array of values from a first position in the array to a second position in the array.

10. The computer-implemented method of any of clauses 1-9, wherein the first position in the array is adjacent to the second position in the array.

11. The computer-implemented method of any of clauses 1-10, wherein the first position in the array corresponds to a last position in the array, and the second position in the array of values corresponds to a beginning position in the array.

12. The computer-implemented method of any of clauses 1-11, wherein the server machine implements a remote desktop session in conjunction with the client machine to generate the frame of rendered graphics data.

13. The computer-implemented method of any of clauses 1-12, wherein the server machine offloads at least one graphics processing operation associated with the client remote desktop to a graphics processor to generate the frame of graphics data.

14. The computer-implemented method of any of clauses 1-13, wherein the at least one graphics processing operation comprises a rendering operation, a capture operation, or an encoding operation.

15. Some embodiments include a non-transitory computer-readable medium storing program instructions that, when executed by at least one processor, cause the at least one processor to at least transmit, at a first point in time, an emulated keystroke to a server machine, receive a graphics object from the server machine in response to the emulated keystroke, determine, at a second point in time, that the graphics object has been modified, and generate a performance metric based on the first point in time and the second point in time.

16. The non-transitory computer-readable medium of clause 15, wherein the graphics object comprises a plurality of rectangles, each rectangle in the plurality of rectangles includes a different color value, and further comprising the step of comparing at least one color value included in the graphics object to a corresponding color value associated with a previous graphics object to determine that the graphics object matches the previous graphics object.

17. The non-transitory computer-readable medium of any of clauses 15-16, wherein the step of computing the performance metric comprises determining a time difference between the first point in time and the second point in time.

18. The non-transitory computer-readable medium of any of clauses 15-17, wherein the emulated keystroke corresponds to a hexadecimal code associated with an nk_clear keyboard command.

19. Some embodiments include a system, comprising a memory storing one or more instructions, and a processor that executes the one or more instructions to at least transmit an emulated keystroke to a server machine, receive a modified graphics object from the server machine in response to the emulated keystroke, and compute a performance metric based on the emulated keystroke and the modified graphics object.

20. The system of clause 19, wherein the modified graphics object comprises a plurality of rectangles, each rectangle in the plurality of rectangles includes a different color value, and further comprising the step of comparing at least one color value included in the modified graphics object to a corresponding color value included in a set of graphics object values to determine that the modified graphics object matches the set of graphics object values.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   transmitting an emulated keystroke to a server machine;
   modifying a first graphics object;
   receiving a second modified graphics object from the server machine in response to the emulated keystroke; and
   as a result of the second modified graphics object matching the modified first graphics object, computing a performance metric based on the emulated keystroke and the second modified graphics object independently of one or more applications running on the server machine.

2. The computer-implemented method of claim 1, wherein the second modified graphics object comprises a plurality of rectangles, wherein each rectangle in the plurality of rectangles includes a different color value.

3. The computer-implemented method of claim 1, further comprising comparing at least one value included in the second modified graphics object to a corresponding value included in a set of graphics object values to determine that the second modified graphics object matches the set of graphics object values.

4. The computer-implemented method of claim 1, further comprising: determining a first point in time when the emulated keystroke is transmitted to the server machine; and
   determining a second point in time when the second modified graphics object is received from the server machine.

5. The computer-implemented method of claim 4, wherein computing the performance metric comprises determining a time difference between the first point in time and the second point in time.

6. The computer-implemented method of claim 1, wherein the emulated keystroke corresponds to a hexadecimal code associated with a vk_clear keyboard command.

7. The computer-implemented method of claim 1, wherein the server machine performs operations comprising:
   in response to receiving the emulated keystroke, modifying a graphics object to generate the second modified graphics object;
   compositing the second modified graphics object with a frame of rendered graphics data to generate a composited frame of graphics data; and
   transmitting the composited frame of graphics data to a client machine.

8. The computer-implemented method of claim 7, wherein the graphics object comprises an array of values, and wherein modifying the graphics object comprises permuting the array of values.

9. The computer-implemented method of claim 8, wherein permuting the array of values comprises moving a first value included in the array of values from a first position in the array to a second position in the array.

10. The computer-implemented method of claim 9, wherein the first position in the array is adjacent to the second position in the array.

11. The computer-implemented method of claim 9, wherein the first position in the array corresponds to a last position in the array, and the second position in the array corresponds to a beginning position in the array.

12. The computer-implemented method of claim 7, wherein the server machine implements a remote desktop session in conjunction with the client machine to generate the frame of rendered graphics data.

13. The computer-implemented method of claim 12, wherein the server machine offloads at least one graphics processing operation associated with the remote desktop session to a graphics processor to generate the frame of rendered graphics data.

14. The computer-implemented method of claim 13, wherein the at least one graphics processing operation comprises a rendering operation, a capture operation, or an encoding operation.

15. A non-transitory computer-readable medium storing program instructions that, when executed by at least one processor, cause the at least one processor to at least:
transmit, at a first point in time, an emulated keystroke to a server machine;
modify a first graphics object;
receive a second graphics object from the server machine in response to the emulated keystroke;
determine, at a second point in time, that the second graphics object matches the modified first graphics object; and
generate a performance metric based on the first point in time and the second point in time independently of one or more applications running on the server machine.

16. The non-transitory computer-readable medium of claim 15, wherein the second graphics object comprises a plurality of rectangles, each rectangle in the plurality of rectangles includes a different color value, and further comprising the step of comparing at least one color value included in the second graphics object to a corresponding color value associated with the modified first graphics object to determine that the second graphics object matches the modified first graphics object.

17. The non-transitory computer-readable medium of claim 15, wherein the step of generating the performance metric comprises determining a time difference between the first point in time and the second point in time.

18. The non-transitory computer-readable medium of claim 15, wherein the emulated keystroke corresponds to a hexadecimal code associated with a vk_clear keyboard command.

19. A system, comprising:
a memory storing one or more instructions; and
a processor that executes the one or more instructions to at least:
transmit an emulated keystroke to a server machine,
modify a first graphics object,
receive a second modified graphics object from the server machine in response to the emulated keystroke, and
as a result of the second modified graphics object matching the modified first graphics object, compute a performance metric based on the emulated keystroke and the second modified graphics object independently of one or more applications running on the server machine.

20. The system of claim 19, wherein the second modified graphics object comprises a plurality of rectangles, each rectangle in the plurality of rectangles includes a different color value, and further comprising the step of comparing at least one color value included in the second modified graphics object to a corresponding color value included in a set of graphics object values to determine that the second modified graphics object matches the set of graphics object values.

21. The computer-implemented method of claim 1, wherein the second modified graphics object matching the modified first graphics object comprises the second modified graphics object matching a permuted version of the first graphics object.

22. The computer-implemented method of claim 1, wherein:
the first graphics object corresponds to a first array of values in a first linear order;
the modified first graphics object corresponds to a second array of values in a second linear order; and
modifying the first graphics object comprises performing a cyclic shift operation on values contained in the first array of values from the first linear order to the second linear order to generate the second array of values.

23. The computer-implemented method of claim 1, wherein the first graphics object is modified in response to the emulated keystroke.

* * * * *